Nov. 17, 1959 J. T. MULLIN 2,913,192

TAPE DRIVE MECHANISM

Filed Sept. 7, 1956

INVENTOR.

JOHN T. MULLIN

BY Lippincott & Smith

ATTORNEYS

United States Patent Office 2,913,192

Patented Nov. 17, 1959

2,913,192

TAPE DRIVE MECHANISM

John T. Mullin, Los Angeles, Calif., assignor to Minnesota Mining & Manufacturing Co., St. Paul, Minn., a corporation of Delaware Application September 7, 1956, Serial No. 608,515

8 Claims. (Cl. 242—55.11)

Figure 1:
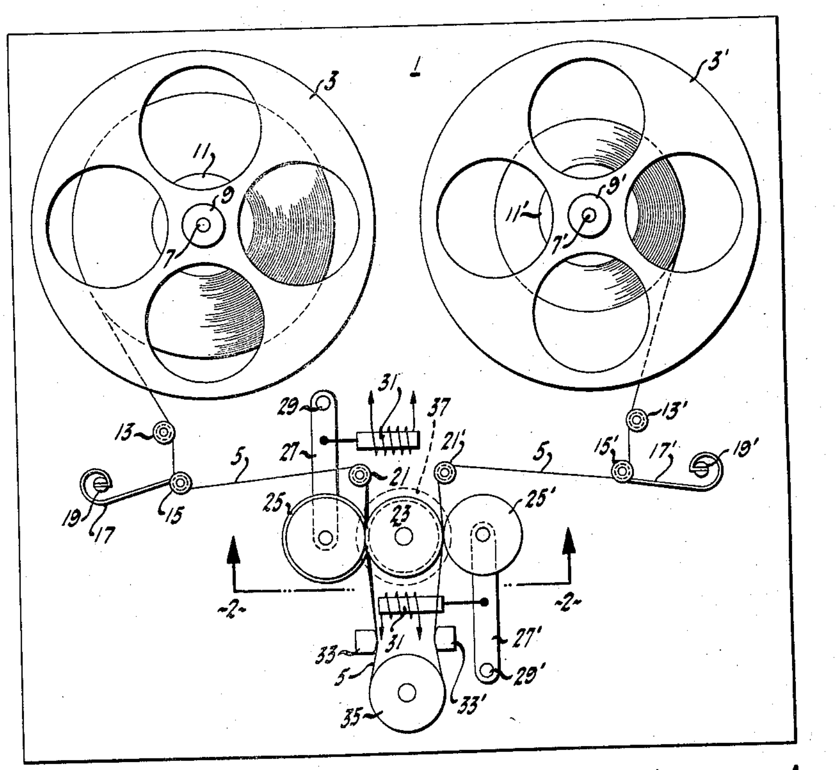

This invention relates to tape-transport mechanisms, for driving under constant tension and speed, tapes, having physical characteristics similar to those used in magnetic recording and reproducing apparatus, from a pay-out magazine to a take-up magazine. While the invention is primarily designed for the transport of high speed magnetic tapes it is not limited to such use but can be employed wherever similar problems of tape transport arise. These problems are present in some degree wherever a tape must be moved, under tension, at constant speed past a given point in its progress. The problems, however, are accentuated where the speed of transport must be relatively high. This is the case in tapes used for the recording and reproduction of television signals. The invention was devised for handling magnetic tapes of this character and therefore will be described as it is applied for this purpose; its application to other uses will be apparent to those skilled in the art.

In the recording and reproduction of television signals not only must a very large amount of information be transmitted in each second but the transmission must be continued for considerable periods of time. The amount of information that can be stored on a given length of tape is limited. Even where band-splitting techniques are used and the information is divided between a number of tracks on the recording medium, the speed of the tape as it traverses the recording and reproducing heads may be from 100 to 300 inches per second. One specific piece of equipment employs a tape speed of 180 inches or 15 feet per second. At this speed the record of a 15 minute program occupies a little over two and a half miles of tape. Even with the thinnest tapes available this length of tape requires a large reel for its storage, from 16 to 20 inches in diameter.

Any variation whatsoever in the speed of the tape as it passes the transducer heads with which recording and reproduction is accomplished results in distortion or instability of the reproduced picture, due to phase or frequency modulation of the reproduced signals. Mechanisms are known for maintaining the average speed of the tape extremely constant. Even with the employment of these mechanisms there remain some short-term speed variations that are known as "flutter" and "wow." Where multiple-track recording is used for the purpose of reducing the length of tape required, there is added an additional variation termed "skew," which is a displacement of relative phase between the signals reproduced from the various tracks, due to variations in the angle of attack of the tape with respect to the transducer heads.

The greater part of these undesired effects can be traced to the pay-off and take-up reels. As has been pointed out already, the reels, when loaded with tape, are both bulky and heavy and they rotate at a peripheral speed of many feet per second. They therefore have a high angular momentum. The tape must be held under tension as it passes the transducer heads. The usual method of tensioning the tape is to apply a braking force to the pay-out reel and a driving force to the take-up reel that are substantially balanced, varying as the lever arm of the tape on the reel windings varies; the actual tape drive is provided by a capstan that engages the tape frictionally. It therefore can be said that in the usual arrangement the reel mechanism determines the tension while the capstan provides the drive. The troubles referred to arise because even with the greatest precautions there always remains some eccentricity in the winding of the tape upon the reels. During a portion of the revolution the tape therefore will pay off at more than its average speed, while during the other half of the revolution it will pay off at less than average speed. Similarly, the speed of the tape varies from the average as it is taken up. It is only during the brief interval when the diameters of the coils on both reels are substantially equal that these variations are even approximately in step, and the tension on the tape therefore varies constantly. The tape is so frail and the momentum of the reels so great that the effect of the variations on the reel speed is immaterial, the differenecs being taken up almost entirely by elastic variations in the length of the tape between the two reels. Part of these variations are manifested by stretch of the tape itself and part by variation in the position of tensioning or take-up arms that engage the tape between the reels.

The variations mentioned alternately assist and oppose the driving force on the tape exerted by the capstan. The usual capstan drive is a synchronous motor. The result of changes in tape tension is a tendency to vary the angle of the capstan with respect to the phase-angle of the driving current, and this is one source of the flutter and wow. Another source is variation in elongation of the tape due to the variation in the tension upon it. Flutter may also be caused by vibration set up in the tape itself and if these vibrations are in its own plane as it passes the transducer-head it may manifest itself as skew. An indirect effect is that because of the magnitude of the stresses set up in the tape, that used must be strong enough to withstand them. Therefore it may not be possible to use the thinnest available tapes; bulkier tapes must be employed and this accentuates the difficulties due to momentum.

In order to avoid these difficulties in so far as possible various means are employed to de-couple the capstan drive from the reels and tensioning means. These de-coupling devices usually take the form of tensioning arms, engaging loops of the tape in such manner that the length of these loops can increase or decrease to take up variations in the pay-off and take-up speeds. Usually, however, the tensioning arms are spring biased. The spring must be strong enough to withstand the tape tension; as it is stressed and relaxed there is, in general, a residual change in tape tension, so that the effects that the tension arms are intended to compensate are reduced, but are not eliminated.

The broad purpose of the present invention is further to reduce the deleterious effects discussed above by further de-coupling the drive and tensioning mechanism from the pay-off and take-up mechanisms. Contributory to this broad purpose, among the objects of the invention are to provide a driving and tensioning mechanism whereby the tension applied to the tape as it passes the transducer heads is not effective on the tape as it leaves and approaches the storage reels; to provide a drive and tensioning mechanism whereby the braking force on the pay-off reel and the driving force on the take-up reel can alike be reduced to a minimum value, merely sufficient to prevent the reels from running free and "casting loops" of the tape during starting or stopping periods, and, in fact, merely sufficient, during running period, to overcome the friction of the reels; to provide a driving mechanism wherein the tensioning or take-up arms are required to withstand only a very small portion of the stress required for full tensioning of the tape and variation in their position produces correspondingly smaller variations in total tape tension; to provide a mechanism which permits the use of take-up arms having very small moment of inertia; to provide a tape drive and tensioning mechanism wherein the active portion of the tape, where it passes the transducer head or heads is less subject to variation in stress and hence less likely to set up vibrations causing flutter and skew; to provide a mechanism of the character described wherein the rigidity of the tape in its own plane is increased, making it less liable to skew-producing vibration; to provide a tensioning mechanism wherein the elastic elongation of the tape under the tensioning stress is a constant, so that the wave-lengths of the signals as recorded on the tape are not subject to variation; and to provide a drive mechanism that by reducing accidental strain on the tape makes it less likely to breakage and permits the use of the lightest obtainable tapes, thus reducing the mass of the records and producing a cumulative improvement in the performance of the apparatus.

In accordance with the present invention the tape transport mechanism may be conventional insofar as the arrangement of payoff and take-up reels, with their respective braking and drive arrangements, are concerned. The tensioning arms interposed between the reels and the drive capstan and transducer heads are conventional in function and positioning but because the forces applied are reduced to a bare minimum the arms can be reduced to a light leaf spring instead of a pivoted lever, practically eliminating inertial and frictional forces from this part of the mechanism. The tape drive mechanism employed is of the "tight loop" type; the tape passes from a guide roller or post into contact with one side of a drive capstan. The direction of travel of the tape is then reversed by passing over another guide to contact another portion of the capstan surface, and thence, usually past another take-up arm, to the take-up reel. The tape contacts the transducer heads in some suitable portion of its travel between the two sides of the capstan. It is forced against the capstan by a pair of nip-rollers which preferably are of rubber or like resilient material, at least on their rims where they contact the tape. As thus far described this arrangement, too, is conventional; experience has shown that with it the tape is driven at the peripheral speed of the capstan, without measurable slip.

The essential features of the invention lie in the construction of the capstan and the nip-rollers. The portion of the capstan in contact with the tape is made of two diameters, very slightly different. Preferably, it is that portion of the capstan that engages the central portion of the tape that has the smaller diameter; the nip-roller on the side of the capstan that contacts the incoming tape has a surface that conforms to the smaller-diameter portion only, and therefore grips only the corresponding portion of the tape. The larger-diameter portion of the capstan is preferably located at the two ends of the capstan and the nip-roller on the outgoing side conforms to that part of the capstan length that is of larger diameter. The outgoing side of the capstan therefore tends to propel the tape at a very slightly higher speed than does the incoming side.

The tapes used are elastic; if placed under tension they elongate. It is quite clear that if two pieces of tape of different lengths are to pass a given point in the same length of time the longer piece must travel at a higher velocity than does the shorter one. With a tape of given size and material, a given tension will produce a definite, given percentage elongation; the difference in diameter of the two portions of the capstan is made proportional to the elongation produced by the desired tension in the tape used. With one desirable tape it has been found empirically that the elongation produced by the desired tension is 0.2 percent; the capstan used to drive the particular tape has an average diameter of one inch and the central portion of the capstan is therefore made 0.002 inch smaller in diameter than the two end portions.

Tape entering the drive mechanism from the payoff reel, and not permitted to slip past it by the nip-roller, is therefore constrained to travel at the peripheral speed of the smaller diameter. The nip-roller on the opposite side of the capstan, however, forces the outgoing tape to travel at a speed higher by 0.2 percent. The result is an elongation of the tape between the rollers that is just sufficient to apply the required tension. The elastic deformation of the tape is closely comparable to a liquid flow; the longitudinal stretch decreases its cross-sectional area but not its total volume and, therefore, for a given volume of the tape to pass between the nip-rollers in a given length of time, the velocity must increase, as the arrangement forces it to do, just as in the case of a liquid passing through a venturi constriction in a hydraulic system.

Figure 2:
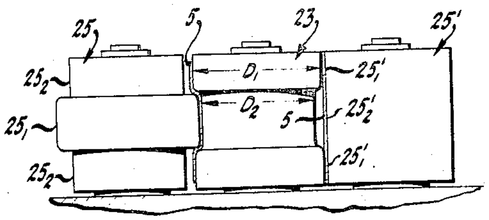
Figure 3:
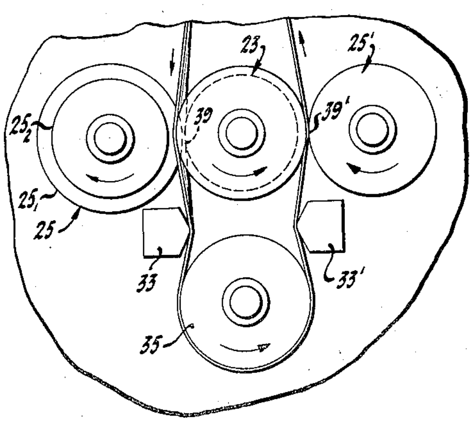

In the drawing, illustrative of a description of a preferred form of the invention which follows:

Fig. 1 is a schematic showing of a tape transport mechanism, indicating one arrangement of the parts entering into the device;

Fig. 2 is an elevational view of a capstan and cooperating nip-rollers as utilized in the invention, this figure not being drawn to scale and the differences in dimension of the various parts being greatly exaggerated; and Fig. 3 is a plan view of the capstan and nip-rollers as shown in Fig. 2, including such additional parts as are necessary to illustrate the path of the tape through the driving and tensioning mechanism that is the subject of the present invention.

Fig. 1 illustrates, in semi-schematic form, a tape-transport mechanism that is conventional except for the tensioning and drive mechanism of the present invention. Such mechanisms are customarily mounted on a panel 1 which may be mounted in any convenient posture, vertical, horizontal or slanted. The panel carries, when in operation, two tape reels: a payoff reel 3 and a take-up reel 3', carrying between them the tape 5. Assuming, for convenience of description, that the panel is mounted horizontally, the reels are removably mounted on vertical shafts 7 and 7', respectively, and in operation are secured thereto by lock bosses 9 and 9'. In one form of mechanism that is used quite generally the shafts 7 and 7' are the shafts of variable speed motors, usually mounted below the panel, and indicated by the circles 11 and 11'. When the equipment is used for recording or reproduction, motor 11 is excited so that it tends to rotate the reel in the direction opposite to that in which it must turn to pay out the tape wound upon it, while motor 11' drives the take-up reel 3' in the proper direction to wind the tape, motor 11 thus acting as a brake. On re-wind the functions of the two motors are reversed. In another type of drive a friction brake is used on the payout reel and a transmission mechanism, usually of the friction type, is used to transfer the drive from one reel to the other on re-wind, where the functions of the reels are interchanged.

Tape coming off of the pay-out reel 3 passes first over a fixed guide post 13 and thence over a second post 15 mounted on the end of a take-up arm 17. Rollers could be used in place of either or both posts. The latter are preferred, however. Made of polished glass or agate their coefficient of friction against the smooth tape is low and with the very light tension on the tape the frictional retarding force is negligible. With fixed guides no problems arise from possible eccentricity, they are lighter and are therefore better. It is even possible to use the end of the spring as the guide, bending it into a curved surface where it engages the tape and polishing it to minimize friction. The take-up arm differs in construction from those conventionally used on transport mechanisms wherein the tape tension is provided at the two reels. In the present case the take-up arm 17 is a highly compliant leaf spring, anchored on a post 19 fixed to the panel 1. Because the load carried by the arm is very small this form of arm can be used. In a conventional mechanism it is customary to employ a pivoted lever arm and a separate retracting spring; such a mechanism has a very considerable inertia. The length of the spring that can be conveniently used in conventional structures is limited, and a given movement of a guide corresponding to the guide 15 may make a very material difference in the force that it exerts. The spring here shown, in its unstressed state, can, if desired, extend substantially parallel to the position illustrated but unwound through a complete revolution of 360 degrees around the post 19. If desired it could be made even longer and have several coils around the post. Accordingly, the movement of a few degrees by the post 15 will change the strain on the spring by a very small percentage. Both the inertial and the elastic forces necessary to move the arm to take up differences in tape length are very small, making the filtering action very effective.

In conventional drives of the high precision type, wherein the tension on the tape is determined by the torque of the drive motor on the take-up reel and the braking force applied to the pay-out reel, a servo mechanism may be used that responds to the tape tension and varies the excitation of the two motors to compensate for the change in the effective lever arm of the tape where it is coiled upon the two reels. Such a mechanism may be used in combination with the present invention but, as will be shown, this is an added and not a necessary refinement. If it is used the excitation of the driving and braking motors is very greatly reduced so that the reversed pull of the braking motor and the forward pull of the drive motor are only a few percent of the value that would be used if they were to provide the tension on the tape. All that is necessary is that the braking force be sufficient to prevent the pay-off reel from over-riding and "casting loops" of the tape.

After passing over the guide 15 the tape travels to a fixed guide 21. It makes a right-angle turn around the latter guide and thence passes tangentially over the drive capstan 23 and under a first nip-roller 25. The nip-roller, if it is to be used for magnetic tape drive as is here contemplated, preferably has at least a rim of resilient material such as rubber, natural or synthetic, although if the invention were to be used to drive a tape itself having a high coefficient of friction the rubber surface would not be necessary.

The nip-roller 25 is shown as mounted on an arm 27 which is pivoted at 29. When the apparatus is in operation the arm and roller are pulled toward the capstan by means of a solenoid 31 (indicated schematically), so that the tape is gripped between the nip-roller and the capstan. A spring could, of course, be used instead of the solenoid to cause the nip-roller to grip the tape.

Passing beyond the capstan the tape passes over a recording head 33 and thence around a guide 35, which may be either a roller or a fixed post having a highly polished surface. Here the use of a roller may be warranted because the tape is under tension as it passes the guide. It is the uncoated surface of the tape, however, that contacts the guide. With plastic tapes having smooth, non-abrasive surfaces the friction is low enough so that a fixed, non-rotating post is frequently preferable.

The recording head 33 is positioned so that the tape is bowed slightly in passing over it, the tension on the tape holding the latter snugly against the head. After passing around the guide 35 the tape traverses first, a reproducer or play-back head 33', between the capstan 23 and a second nip-roller 25' in succession and thence over a guide 21', a guide 15' on a take-up arm 17' over a fixed guide 13' and so to the take-up reel 3'. Because the parts identified by the accented reference characters are substantially identical in construction with those bearing similar unaccented reference characters, a description of the like parts is not repeated.

The torque on the braking and the take-up motors 11 and 11' is preferably so evenly balanced that there is no tendency for the tape to move in either direction. With the invention here described the part of the tape tension effective on the reels is so small and is de-coupled so effectively from the drive that it is quite feasible to omit any equipment for keeping the opposing moments constantly balanced, the adjustment being sufficiently accurate if they are approximately so. The two torques may, for example, be equal even though this results in a constantly increasing restraining pull on the tape and load on the drive capstan as the tape pays out. Such long term variations in tension are substantially self-compensating; it is the higher frequency variations that cause trouble.

The total net driving force on the tape is, ideally, all supplied to it by the capstan, which is mounted on the shaft of a constant speed motor that is supported under the panel and is indicated by the dotted circle 37. This motor is preferably of the synchronous type. In recording it is driven by current of constant and accurately controlled frequency. On playback its supply frequency may be governed through a servo mechanism under the control of a recorded pilot frequency, the servo loop being so designed as to compensate for any expansion or contraction of the tape due to temperature or humidity changes.

The particular features on which the present invention depends are so minute in dimension that they cannot be shown in a general figure such as Fig. 1 and they must be greatly exaggerated in order to illustrate them even in greatly enlarged views such as Figs. 2 and 3. Fig. 2 shows the capstan 23 and its two nip-rollers 25 and 25' in elevation, the plane of this view being indicated by the line 2—2 in Fig. 1.

In a drive of conventional type the capstan 23 would be accurately ground to a uniform diameter throughout its length and each of the nip-rollers 25 and 25' would also be of uniform diameter throughout its length. The operation of the present invention depends upon the fact that the capstan 23 is not of uniform diameter. Preferably the portions of larger diameter, indicated in the drawing as $D_1$, are at the ends of the capstan while the portion of smaller diameter, $D_2$, is in the center of that part of the capstan length which engages the tape. The result is that in the drawing the capstan has a definite spool-shaped appearance. In the actual equipment this spool-like conformation is almost imperceptible; with the tape for which the particular equipment described is designed the desired tension would produce an elongation of approximately 0.2 percent. In this case the diameter $D_1$ is equal to one inch and the diameter $D_2$ is 0.002 inch smaller, i.e., the groove between the two major-diameter ends is only $1/1000$ inch deep. The capstan is precision ground to accurate concentricity with the shaft on which it is mounted. The tolerance required in the outer dimension is not very rigid, as a difference of one or two thousandths in diameter is not very important; the tolerance as to the depth of the groove is rigid, since the ratio of elongation of the tape is equal to the ratio of diameters; this latter ratio varies very slowly if the two diameters vary by equal increments but rapidly where one diameter is varied without a similar change in the other.

The surface of the nip-roller 25 conforms only to the smaller diameter portion of the capstan. The active surface of the nip-roller, indicated in Fig. 2 as in contact with the tape 5 and compressing it against the capstan at $25_1$, is the only portion of the nip-roller that is really necessary to the invention. Because the nip-roller is made of semi-soft rubber, as to its surface at least, it is convenient to make it the full length of the capstan as shown. Like the capstan it is preferably ground to accurate circularity, and in this process the end portions $25_2$ are relieved sufficiently so that when the nip-roller is fully pulled forward against the tape and capstan, the end portions clear the tape completely and serve merely to support the active, central portion of the roller. A metal roller could be used, with a rubber rim or tire in contact with the tape; the construction used is employed because it promotes interchangeability of parts. The nip-roller 25' is the converse of roller 25 and only its end portions $25'_1$ contact the tape and grasp it against the capstan. In this case it is the central portion $25'_2$ that could be omitted entirely if desired.

In operation the nip-rollers are urged against the capstan and tape with enough force to deform the resilient rims of the rollers so that their area of contact departs materially from the theoretical line contact between two, parallel-axis cylinders and the tape is grasped between measurable areas of the capstan and nip-rollers. The grasp is firm enough so that it is possible to apply enough tension on the tape to break it without slippage. The rubber rim of the nip-roller passes the capstan by a process than can be termed "elastic flow"; volumetrically, rubber is practically incompressible and in passing the capstan it is deformed so that the periphery of the roller moves at the same peripheral speed as that portion of the capstan with which it is in contact.

Because the tape does not slip between the points 39 and 39' as it passes around the recording loop, it enters the loop at the speed of minimum capstan diameter, traveling at this speed until it is released from the grip between roller and capstan. Upon leaving the capstan it travels at the peripheral speed of the outer capstan diameter until it is released from the grip at 39'. In order to do this it must be strained to an extent that will elongate it in the ratio of the two diameters and since stress is proportional to strain the tape is subjected to a tension proportional to its elongation. The elongation is very nearly, although not exactly, uniform around the loop between 39 and 39'. Frictional retarding forces are effective where the tape passes the transducer heads 33 and 33' and around the reversing guide roller or post 35. These frictional forces are, however, very small as compared to the tension on the tape because the transducer heads and other rubbing surfaces are highly polished.

Where the tape enters the loop 39 it is given a very slight longitudinal bend that stiffens it, both in its own plane and in the plane normal to the paper in Fig. 3. A somewhat similar effect undoubtedly takes place between the point 39' and the playback transducer 33'. The effect of the resultant stiffening is to decrease the tendency of the tape to vibrate in either plane; this undoubtedly contributes to the reduction in the type of flutter that produces skew, as well as flutter in the plane normal to the tape, the effect of which is to advance and retard, alternately, the position of the tape contact with the transducer heads. It is difficult to determine to just what extent the improvement in performance observed with the apparatus is due to these effects alone and what proportion is due to improved filtering of the varying components of tape motion introduced by the other parts of the equipment.

The action of the differential capstan can be illustrated very readily by operating the apparatus with the loop between the point 39 and 39' loose instead of tight around the reversing guide 35. The device described is supposed to progress the tape at 180 inches per second. Running at this speed the tape comprising the loop shortens at the rate of .37 inch per second until it engages the reversing idler 35, indicating that the tape is feeding out of the loop $\frac{2}{10}$ of one percent faster than it feeds in.

In spite of the fact that it is the capstan that applies the tension to the tape in the loop, the actual work expended by it in so doing constitutes a very small addition to the frictional load it carries and this, in itself, is very slight. The moment on the capstan applied by the outgoing tape, tending to retard the capstan rotation, differs from that applied at point 39 by the incoming tape only in the ratio of the two diameters. The major net stress upon the capstan is due to the pull of the two sides of the tape toward the reversing guide 35. If desired this can be compensated very largely by mounting the two nip-rollers so that they contact the capstan at points separated by about 90 degrees, equally spaced on the side of the capstan toward the reversing guide, instead of diametrically opposite points. This would relieve the load on the capstan bearing, giving a component force away from the reversing idler to balance the tension force of the tape. Because the capstan bearing can be made very large and rugged this refinement has not proved to be sufficiently desirable to warrant the changes it would have made necessary in the otherwise conventional tape transport mechanism to which the invention was first applied.

One result of the invention is that if designed for a tape of a given material and thickness it will handle thicker or thinner tapes without breaking. It strains the tape to a given elongation and in so doing applies a definite stress per unit cross-sectional area. It has been found that equipment originally designed for a fairly heavy tape will handle the lightest available tapes of like material without breakage and it has made possible the use of one mil "Mylar" tape, which could not be used in the required lengths at the 180 inch per second speed using conventional tensioning means.

It will be evident that if the direction of tape movement is reversed, as is the case when re-winding (if this is accomplished on the same mechanism) the differential feature of the drive cannot be used, as the tape would be fed into the loop at a faster rate than at which it is being removed, resulting in an accumulation of the tape within the loop. Accordingly, in re-wind, the solenoid 31' is not excited and the entire drive is provided by the smaller-diameter portion of the capstan operating against nip-roller 25.

While several modifications of the arrangement shown have been suggested, others are obviously possible. The scope of the invention is not intended to be limited to the constructional details shown in the illustrative apparatus, intended limitations all being specifically recited in the claims which follow.

I claim:

1. A tape-transport mechanism for magnetic recorders and like tape-handling apparatus, comprising a driving capstan having a tape-engaging portion of a length substantially equal to the width of the tape to be driven, one part of said tape-engaging portion having a different diameter than another part thereof, a motor for rotating said capstan at a substantially constant speed, a nip-roller having a rim shaped to conform to the smaller diameter part of said capstan and movably mounted on one side of said capstan so as to admit the tape between roller and capstan in one position and to grasp the tape between roller and capstan in another position, a second nip-roller similarly mounted on the other side of said capstan and having a rim conformed to the part of said capstan of larger diameter, and means for forcing said nip-rollers toward said capstan to grasp said tape therebetween.

2. A tape-transport mechanism for magnetic recorders and like tape-handling apparatus comprising a driving capstan having a tape-engaging portion of a length substantially equal to the width of the tape to be driven, the central part of said tape engaging portion having a different diameter than the ends thereof, a motor for rotating said capstan at a substantially constant speed, a nip-roller having a rim shaped to conform to the smaller diameter part of said capstan and movably mounted on one side of said capstan so as to admit the tape between roller and capstan in one position and to grasp the tape between roller and capstan in another position, a second nip-roller similarly mounted on the other side of said capstan and having a rim conformed to the part of said capstan of larger diameter, and means for forcing said nip-rollers toward said capstan to grasp said tape therebetween.

3. A mechanism in accordance with claim 2 wherein the smaller diameter portion of the capstan is that at the center thereof.

4. A tape-transport mechanism for driving and tensioning tape of slightly elastic material such as plastic, paper, and the like and tensioning said tape to a degree that will produce a given percentage extension thereof, comprising a capstan having cylindrical driving surfaces adapted to engage, respectively, the central portion and the edges of the tape, the diameters of said surfaces differing in the ratio of a desired percentage elongation of said tape, a motor adapted to rotate said capstan at constant speed, a pair of nip-rollers movably mounted to engage the periphery of said capstan at angularly separated points, the rim of one of said rollers being shaped to conform the tape to the smaller diameter surface of said capstan and the rim of the other roller being shaped to conform the tape to the larger diameter surface thereof.

5. A tape-transport mechanism for driving and tensioning tape of slightly elastic material such as plastic, paper, and the like and tensioning said tape to a degree that will produce a given percentage extension thereof, comprising a capstan having cylindrical driving surfaces adapted to engage, respectively, the central portion and the edges of the tape, the diameters of said surfaces differing in the ratio of the desired percentage elongation of said tape, a motor adapted to rotate said capstan at constant speed, a pair of nip-rollers movably mounted on opposite sides of said capstan, the rims of each of said rollers being of resilient material and the rim of one of said rollers being shaped to conform the tape to the smaller-diameter surface of said capstan and the rim of the other roller being shaped to conform the tape to the larger-diameter surface thereof.

6. A tape-transport mechanism for driving and tensioning tape of slightly elastic material such as plastic, paper, and the like and tensioning said tape to a degree that will produce a given percentage extension thereof, comprising a capstan having cylindrical driving surfaces adapted to engage, respectively, the central portion and the edges of the tape, the diameters of said surfaces differing in the ratio of a desired percentage elongation of said tape and the central portion having the smaller diameter, a motor adapted to rotate said capstan at constant speed, a pair of nip-rollers movably mounted on opposite sides of said capstan, the rims of each of said rollers being of resilient material and the rim of one of said rollers being shaped to conform the tape to the smaller diameter surface of said capstan and the rim of the other roller being shaped to conform the tape to the larger diameter surface thereof.

7. A tape driving mechanism for progressing elastically deformable tape past a fixed position at constant speed and tension, comprising a pair of journaled shafts adapted respectively to mount a pay-out reel and a take-up reel for the tape to be transported, means for applying to said shafts respectively a braking torque and a substantially equal driving torque both of a lower order of magnitude than that required to tension the tape to the desired stress, driving means positioned between said shafts to draw the tape from said pay-out reel and supply it to said take-up reel, comprising a capstan having a tape-engaging periphery of two diameters differing by a small fraction of their average value, a constant-speed motor driving said capstan, a pair of nip-rollers positioned on opposite sides of said capstan, one of said nip-rollers nearer the pay-out reel shaft having a rim adapted to conform the tape to the smaller-diameter portion of said capstan only and the other of said nip-rollers having a rim adapted to conform the tape to the larger-diameter portion of said capstan only, means for urging said nip-rollers toward said capstan to grip the tape therebetween, and means for taking up variations in the length of the tape between said reels.

8. The invention in accordance with claim 7 wherein said means for taking up variations in the length of said tape comprises a leaf spring and a tape-guide mounted thereon and positioned to strain said spring in engaging said tape so as to force said tape into an indirect path of variable length in its passage between one of said reels and said capstan.

References Cited in the file of this patent

UNITED STATES PATENTS

| | | |
|---|---|---|
| 1,920,789 | Heisler | Aug. 1, 1933 |
| 1,998,931 | Kellogg | Apr. 23, 1935 |
| 2,349,018 | Tasker | May 16, 1944 |
| 2,373,107 | Duffy | Apr. 10, 1945 |
| 2,408,320 | Kuhlik | Sept. 24, 1946 |
| 2,659,541 | Camras | Nov. 17, 1953 |